Patented June 10, 1930

1,763,326

UNITED STATES PATENT OFFICE

MARION C. REED, OF AKRON, OHIO, ASSIGNOR TO THE B. F. GOODRICH COMPANY, OF NEW YORK, N. Y., A CORPORATION OF NEW YORK

METHOD OF STABILIZING ALDEHYDES

No Drawing.   Application filed December 19, 1928.   Serial No. 327,183.

This invention relates to the art of preserving readily oxidizable substances, such as aldehydes, and has as its object to provide a method for retarding the oxidation of such substances without substantially accelerating their polymerization.

It is well known that aldehydes are readily oxidized to the corresponding carboxylic acids, when they are exposed to the air or to oxidizing agents. Thus butyraldehyde is oxidized more or less rapidly to butyric acid:

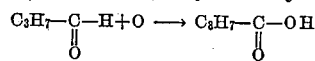

and benzaldehyde to benzoic acid:

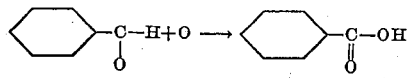

The oxidation sometimes proceeds so rapidly that a major portion of the aldehyde is converted to the acid in the course of a few weeks. The stabilization of the aldehydes so that they can be stored, shipped, or otherwise handled without excessive loss, is therefore of the greatest commercial importance.

It has heretofore been proposed to stabilize aldehydes by adding small proportions of phenolic substances such as pyrogallol, hydroquinone, guaiacol, gallic acid, etc. Such substances, although they have some inhibitory effect on the oxidation of aldehydes to the corresponding fatty acids, are not effective in preventing the polymerization of the aldehydes, in some cases even accelerating the polymerization.

I have discovered that the oxidation of aldehydes may be almost entirely prevented by treating them with a member of a new class of stabilizing agents.

This invention, in brief, consists in adding a small proportion of a secondary aromatic amine to an aldehyde. Both oxidation and polymerization of the aldehyde are thereby checked. Any aldehyde may be stabilized by the method of this invention, but the method is most useful when applied to the aliphatic aldehydes of low molecular weight, which are particularly readily oxidized and polymerized. For example, the oxidation of acetaldehyde, butyraldehyde, heptaldehyde, acrolein, crotonaldehyde, furfuraldehyde or benzaldehyde is greatly retarded if a small proportion, say 0.01% to 1%, of a secondary aromatic amine is added thereto.

Secondary amines in general possess the property of retarding the oxidation of aldehydes. For example, diphenylamine, phenyltolylamine, methyl - alpha - naphthylamine, iso-amyl-alpha-naphthylamine, phenyl-beta-naphthylamine, phenyl - alpha - naphthylamine, the tolyl-naphthylamines, the dinaphthylamines, symmetrical diphenyl-p-phenylene-diamine, symmetrical di-beta-naphthyl-p-phenylene-diamine, etc., are all extremely effective in retarding the oxidation of aldehydes. Substitution products, such as the halogen, hydroxy, or amino substitution products of the secondary aromatic amines, may also be employed to retard the oxidation of aldehydes when their special properties, such as their acidity or basicity, etc., are not objectionable.

However, it is preferred to employ an unsubstituted secondary aromatic amine containing at least three aromatic hydrocarbon rings, since compounds of this class have been found most effective in retarding oxidation, while at the same time largely preventing polymerization. The reason for the difference in polymerizing action between amines containing three aromatic rings and amines containing only two is not known, but a marked difference has been found to exist. This preferred class of secondary aromatic amines includes compounds in which the three aromatic rings are quite distinct, for example symmetrical diphenyl-p-phenylene-diamine

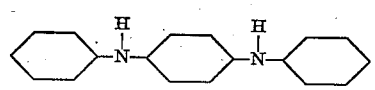

as well as those in which two of the aromatic rings are condensed into a single nucleus, for example phenyl-beta-naphthylamine

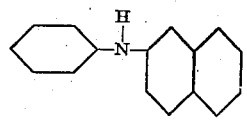

Such compounds cause a very great reduction in the rate of oxidation of the aldehydes, and almost entirely prevent polymerization.

*Example 1.*—The effectiveness of the preferred class of stabilizing agents is indicated by the following experiment, in which a sample of commercial butyraldehyde was divided into three equal portions, which were placed in wide-mouthed, glass-stoppered bottles together with some small pieces of iron. One portion was used as a control, while the others contained 0.5% respectively of phenyl-beta-naphthylamine, and symmetrical di-beta-naphthyl-p-phenylene-diamine. The bottles were opened, shaken, and the contents exposed to the air, each day for a period of 16 weeks. The samples were analyzed at the expiration of 4 weeks and of the full 16 weeks. The acidity was determined by titration, using phenolphthalein as indicator and calculated as butyric acid.

Oxidation of butyraldehyde

| Stabilizer | Control | 0.5% phenyl-beta-naphthylamine | 0.5% sym. di-beta-naphthyl-p-phenylene-diamine |
|---|---|---|---|
| | Per cent | Per cent | Per cent |
| Original acidity | 0.75 | 0.75 | 0.75 |
| Acidity after 4 weeks | 13.3 | 1.08 | 1.06 |
| Acidity after 16 weeks | 28.3 | 2.26 | 2.17 |

The acidity in the above table is a direct measure of the oxidation, since the oxidation products of aldehydes are acids. The samples containing the stabilizing agents were found to have undergone considerably less polymerization than the control.

*Example 2.*—The effectiveness of such stabilizing agents in other aldehydes is indicated by the following experiment, in which an unsaturated aldehyde and a cyclic aldehyde were employed. Samples of crotonaldehyde and of furfural, both without and with 1% of phenyl-beta-naphthylamine, were prepared and tested in a manner similar to that described in Example 1 above. The acidity in the crotonaldehyde columns of the following table represents concentration of crotonic acid, while the acidity in the furfural columns represents concentration of pyromucic acid.

Oxidation of aldehydes

| Aldehyde | Crotonaldehyde | | Furfural | |
|---|---|---|---|---|
| Stabilizer | Control | 1% phenyl-beta-naphthylamine | Control | 1% phenyl-beta-naphthylamine |
| | Per cent | Per cent | Per cent | Per cent |
| Original acidity | 0.9 | 0.9 | 1.8 | 1.8 |
| Acidity after 4 weeks | 9.5 | 1.2 | 2.9 | 1.7 |
| Acidity after 16 weeks | 21.3 | 1.5 | 7.2 | 1.8 |

The addition of the preferred type of stabilizing agents in every case greatly reduces oxidation of the aldehydes, while substantially checking polymerization.

The simpler secondary aromatic amines have also been found quite effective in retarding the oxidation of aldehydes, when subjected to the test described in Example 1 above. For example, diphenylamine, when added to butyraldehyde in 0.5% concentration, reduced the rate of oxidation to less than one-third of that found in the control. However, the diphenylamine facilitates the polymerization of the aldehyde to such an extent that after only four weeks the aldehyde content in the above experiment had dropped to less than 30%, the remainder of the mixture consisting of substantially inactive polymers or condensation products. When such polymerization is undesirable, the simple secondary amines of the type of ethylaniline, diphenylamine, ditolyl-amine, etc. should not be employed as stabilizing agents, but rather some member of the preferred class hereinabove described should be selected.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of stabilizing aldehydes which comprises adding a small proportion of a secondary aromatic amine to an aldehyde.

2. The method of stabilizing aldehydes which comprises adding to an aldehyde a small proportion of a substance selected from the class comprising diarylamines and substitution products thereof.

3. The method of stabilizing aldehydes which comprises adding to an aldehyde a small proportion of a substance selected from the class comprising diarylamines and substitution products thereof, the said substance containing at least three aromatic rings in the molecule.

4. The method of stabilizing aldehydes which comprises adding to an aldehyde a small proportion of a substance selected from the class comprising aryl-naphthylamines and substitution products thereof.

5. The method of stabilizing aldehydes which comprises adding a small proportion of an aryl-naphthylamine to an aldehyde.

6. The method of stabilizing aliphatic aldehydes which comprises adding a small proportion of an aryl-naphthylamine to an aliphatic aldehyde.

7. The method of stabilizing aliphatic aldehydes which comprises adding a small proportion of phenyl-beta-naphthylamine to an aliphatic aldehyde.

8. The method of stabilizing aliphatic aldehydes which comprises adding from 0.01% to 1% of phenyl-beta-naphthylamine to an aliphatic aldehyde.

9. A stable composition of matter comprising an aldehyde and a small proportion of a secondary aromatic amine.

10. A stable composition of matter comprising an aldehyde and a small proportion of a substance selected from the class comprising diarylamines and substitution products thereof.

11. A stable composition of matter comprising an aldehyde and a small proportion of a substance selected from the class comprising diarylamines and substitution products thereof, the said substance containing at least three aromatic rings in the molecule.

12. A stable composition of matter comprising an aldehyde and a small proportion of a substance selected from the class comprising aryl-naphthylamines and substitution products thereof.

13. A stable composition of matter comprising an aldehyde and a small proportion of an aryl-naphthylamine.

14. A stable composition of matter comprising an aliphatic aldehyde and a small proportion of an aryl-naphthylamine.

15. A stable composition of matter comprising an aliphatic aldehyde and a small proportion of phenyl-beta-naphthylamine.

16. A stable composition of matter comprising butyraldehyde and a small proportion of phenyl-beta-naphthylamine.

In witness whereof I have hereunto set my hand this 15th day of December, 1928.

MARION C. REED.